Feb. 21, 1956
H. E. SCHULTZE
2,735,670
SELF-CENTERING SHOCK ABSORBER
Filed May 22, 1952
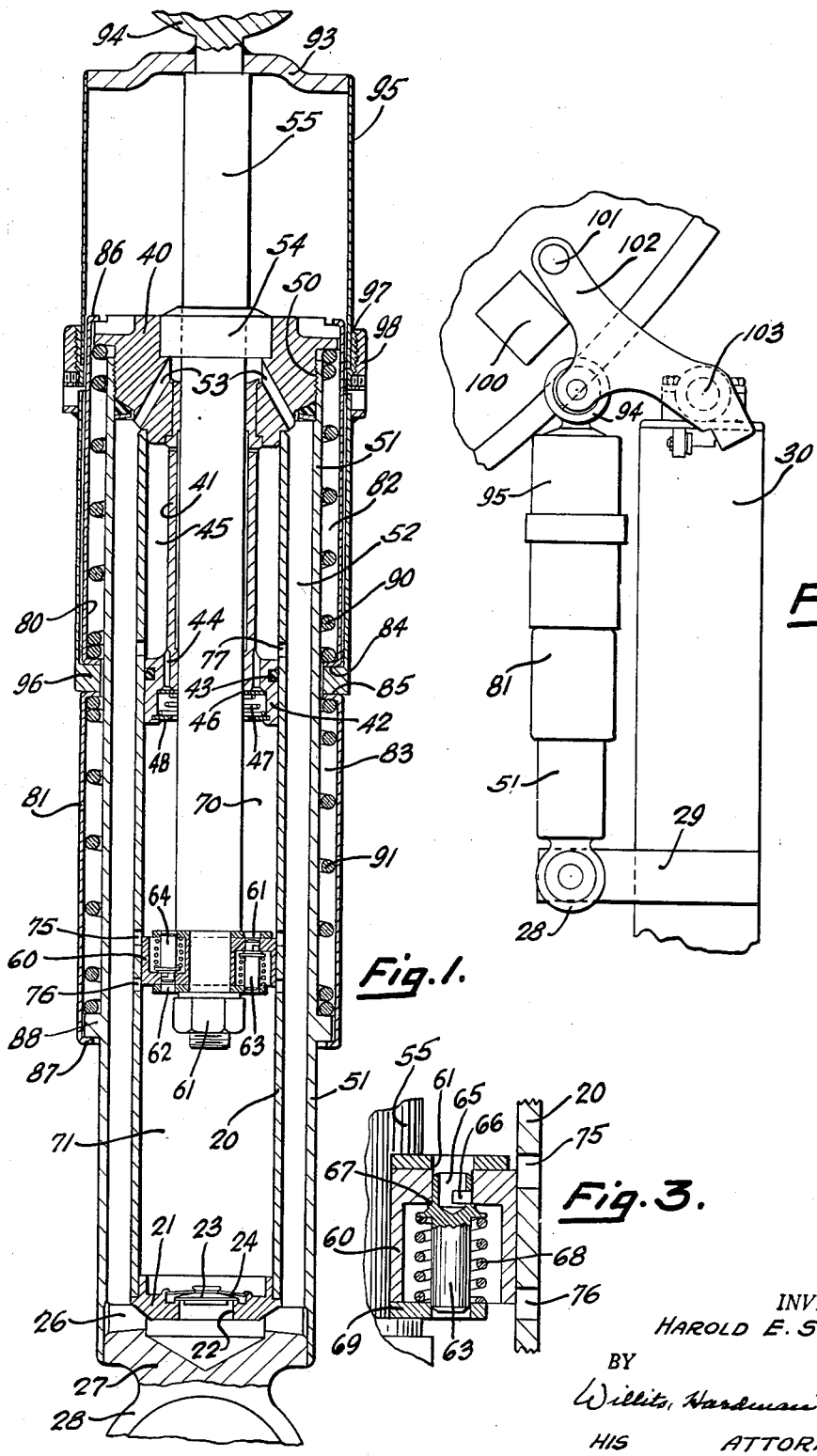
INVENTOR.
HAROLD E. SCHULTZE
BY
Willits, Hardman and Fisher
HIS ATTORNEYS

United States Patent Office 2,735,670
Patented Feb. 21, 1956

2,735,670
SELF-CENTERING SHOCK ABSORBER

Harold E. Schultze, Dayton, Ohio, assignor to General Motors Corporation, Detroit, Mich., a corporation of Delaware Application May 22, 1952, Serial No. 289,285

6 Claims. (Cl. 267—1)

This invention relates to a self-centering hydraulic shock absorber.

It is among the objects of the present invention to provide a double acting hydraulic shock absorber with self-centering means which return it to normal position after being actuated by the movement of one of the two relatively movable members between which it is connected.

The double acting hydraulic shock absorber is connected between two relatively movable members and is operative to absorb and/or cushion any sudden relative movements of one of said members to the other. After this movement has been cushioned, the shock absorber is operative to return said members into their normal relative positions. The shock absorber is designed to cushion movements of said members in either direction and then return to the normal intermediate position. It is particularly adapted to be used on the mounts of guns or missile throwers which thrust their carriages out of normal aimed position due to recoil upon firing, the shock absorber, when attached to said carriages, cushioning the sudden thrust and absorbing the impact, then returning the carriage to normal aimed position.

Further objects and advantages of the present invention will be apparent from the following description, reference being had to the accompanying drawings wherein a preferred embodiment of the present invention is clearly shown.

In the drawings:

Fig. 1 is a longitudinal sectional view of the self-centering shock absorber.

Fig. 2 is a schematic view illustrating one shock absorber installation.

Fig. 3 is a detail sectional view showing one of the fluid flow restricting valves in the piston.

Referring to the drawings, the numeral 20 designates the inner tube of the direct acting hydraulic shock absorber which forms the working cylinder thereof. At one end of this tube 20 there is provided a valve cage 21 secured to the end of the tube in any suitable manner, the valve cage having a central opening 22 surrounded by an annular ridge on the inside of the valve cage forming a seat engaged by the intake valve 23 which is urged upon said seat by resilient fingers 24 formed on a ring secured to the valve cage in any suitable manner. This intake valve 23 closes the end of the cylinder 20 against the escape of fluid therefrom at this end but permits fluid to enter into the cylinder through the opening 22 in the valve cage 21. This valve cage rests upon radial ribs 26 formed on the inner end surface of the head member 27 which has a ring formation 28 providing a mounting member by means of which this end of the shock absorber may be attached to one of the relatively movable members whose movement the shock absorber is adapted to cushion. In the installation shown in Fig. 2, rings 28 are secured to a bracket 29 attached to the rigid stand 30.

The other end of the cylinder 20 has the central portion of a head member 40 extending into it, said central portion having a tubular extension 41, either integral therewith or, as shown in Fig. 1, fitting into a central recess in said head member 40, this tubular extension 41 projecting into the cylinder for a predetermined distance and having an enlarged head portion 42 which fits within the cylinder. Any suitable packing 43 may be provided on the head member 42 preventing leakage between the cylinder wall and its engaged head member 42. The side of the head member 42 facing the valve cage 21 at the lower end of the cylinder is recessed, the head member having a plurality of fluid passages 44 providing communication between the recess end of the head 42 and the annular space 45 formed between the tubular extension 41 and the inner wall of the cylinder 20. A disc valve 46 is yieldably urged against the bottom surface of the recess end of the head member 42 by a spring 47 which is seated upon a retainer ring washer 48 secured in the recess of the head member 42. Thus the spring loaded valve 46 prevents fluid from passing from the cylinder portion between valve cage and the head member 42 into the space 45 between the head member 42 and the head member 40, said spring however permitting fluid to flow from said space 45 through the passages 44 into the cylinder space between the head member 42 and the valve cage 21. The head member 40 has an annular portion threaded as at 50 which is larger in diameter than the portion of said head member extending into the cylinder 20. This threaded portion 50 of the head portion member 40 receives a threaded end of a tubular member 51 which may be termed the reservoir tube, the other end of said reservoir tube 51 being secured to the head member 27 in any suitable manner such as welding or the like. These head members 40 and 27 hold the tube 51 concentric of the cylinder tube 20, the tube 51 forming an annular chamber 52 about the cylinder 20, said chamber forming the fluid containing reservoir of the shock absorber which is in communication with the one end of the cylinder through the valve controlled passage 22 in the valve cage 21. The other end of the reservoir 52 is in communication with a recess in the head member 40 through ducts 53 the recess in the head member 40 forming a container for the packing 54 surrounding the piston rod 55.

Piston rod 55 is slidably supported by the packing 54 and also by bearing portions provided in the tubular extension 41 of the head member 40. This rod extends into the working chamber of the cylinder 20 and has a piston 60 secured thereto by a clamping nut 61 threaded to the rod. This piston 60 has two fluid flow passages 61 and 62, the flow of fluid through these passages being controlled by spring loaded fluid flow restricting valves 63 and 64 respectively, these valves being substantially identical in construction but acting in opposite directions. Fig. 3 shows one of these valves in detail, the valve having a recess head portion 65 with a side opening 66 communicating with the interior of said recess. A flange 67 on the valve 63 engages the inner end of the piston recess so that the side opening 66 in the valve is normally held within the confines of the passage 61 which it is adapted to control. A coil spring 68 engages the valve and abutment collar 69 on the piston, said spring yieldably maintaining the valve 63 in the passage closing position. It will be seen that this valve 63 will prevent fluid from flowing into the upper cylinder chamber 70 from the lower chamber 71 as the piston is reciprocated toward the valve cage 21 by the piston rod 55, the other valve 64 in this instance acting to establish a restricted flow from said chamber 71—70. Upon reverse reciprocation of piston 60, that is, when piston 60 moves toward the cylinder end head 42, then valve 63 becomes effective in response to fluid pressure to establish a restricted fluid flow from chamber 70 into the chamber 71. When the piston 60 is in normal position within the cylinder which is substantially midway between the cylinder end member 42 and the valve cage 21 said piston is positioned between two openings 75 and 76 in the cylinder wall, the opening 75 being contiguous to the one side of the piston 60 while opening 76 is contiguous to the opposite side of said piston. Both openings 75 and 76 provide unrestricted communication between the reservoir 52 and the interior of the working cylinder 20. A similar opening 77 is provided in the cylinder wall adjacent the head member 42 and provides communication between the reservoir 52 and the annular space 45 between the cylinder and the tubular extension 41 and head member 40.

The piston 60 is held in its normal position between openings 75 and 76 in the cylinder wall by yieldable means outside the reservoir tube 51. This self centering means consists of two shells 80 and 81 surrounding the reservoir tube 51 so as to form annular spaces 82 and 83 respectively around said reservoir tube. The adjacent ends of these two shells 80 and 81 have inwardly etxending annular flanges 84 and 85 respectively held in normal spaced relation by the engagement of an inwardly extending annular flange 86 on the shell 80 which flange 86 normally rests upon the annular edge of the head member 40, while the shell 81 has an inwardly extending annular flange 87 at its outer end which normally engages an outward extending annular flange 88 provided on the reservoir tube 51. The engagement of the end flanges 86 and 87 on the respective shells 80 and 81 thus normally holds the adjacent flanges 84 and 85 of said shells in spaced relation. A coil spring 90 is provided in the annular space 82 in the shell 80, the one end of the coil spring engaging the flange provided on the head 40, the other end of said spring resting upon the annular flange 84 of shell 80 so that this coil spring 90 normally holds the flange 86 of the shell 80 in engagement with the outer end surface of the head member 40. A similar spring 91 is provided inside of the shell 81, one end of the spring engaging the flange 88 on the reservoir tube 51, the other end of said spring engaging the flange 85 on shell 81 and thus maintaining the annular flange 87 of shell 81 in engagement with the flange 88 on the reservoir tube 51.

The end of the piston rod 55 extending outside the end housing 40 of the shock absorber has a disc 93 secured thereto in any suitable manner as for instance by welding and also a mounting ring 94 which mounting ring serves to anchor this end of the shock absorber to the other relatively movable member whose movement the shock absorber is adapted to cushion. One end of a casing 95 is securely fastened to the peripheral surface of the disc 93, as for instance by welding, this casing 95 enveloping the shell 80 and having abutment ring 96 secured to the inner wall thereof, said abutment ring 96 extending into the space between the adjacent flanges 84 and 85 of the respective shells 80 and 81 so as to be normally engaged by said inwardly extending flanges. Shell 95 may be made of one piece or it may be made of two portions as shown, secured together by rings 97 and 98, the one being secured to the one portion of the shell, the other to the other portion of the shell and the rings in turn being threaded or secured together in any suitable fashion. This shell 95, being attached to the piston rod 55, is moved longitudinally of the shock absorber as the piston rod 55 is moved to reciprocate the piston 60 within the cylinder 20 of the shock absorber. As the shell 95 is reciprocated in one direction or the other in response to such piston reciprocation, either one or the other of the shells 80 and 81 is moved to compress the respective spring therein, the compressed spring urging the shock absorber into its normal position after the movement of the relatively movable member to which the shock absorber is connected has been cushioned and has ceased.

It has been stated previously that the present shock absorber is particularly adapted to be used in connection with the carriage of the guns or missile throwers whereby the shock absorber may cushion the sudden movements caused by recoil. The recoil under normal circumstances would tend to cause the throwing of the gun or missile out of its aimed position and therefore the present shock absorber is designed, after cushioning the impact caused by recoil, to move into normal position and thereby return the gun carriage or missile thrower carriage into normal position or the original aimed position. Fig. 2 is a schematic illustration of an installation in connection with a military mechanism in which the block 100 is thrust in one direction or the other, depending upon its attachment to the carriage, this block in turn striking a projection 101 on a lever 102 pivoted at 103 to the rigid standard 30, the intermediate portion of the lever 102 having the mounting ring 94 of the shock absorber attached thereto.

If, for instance, firing of the ordnance causes the block 100 to be thrust upwardly against the abutment 101 on lever 102, the lever will be moved clockwise about its pivotal mount 103 thereby pulling the mounting ring 94 upwardly with it. As the mounting ring 94 moves upwardly it will pull the piston rod 55 through the shock absorber packing 54 and the head member 40, thus moving the piston 60 upwardly in the cylinder 20 to exert pressure upon the fluid within the chamber 70. As the piston 60 moves upwardly the opening 75 in cylinder 20 will be closed by the piston and thus the fluid in the work chamber 70 of the cylinder can escape only by moving the pressure relief valve 63 from its seat to establish a restricted flow of fluid from the chamber 70 through the piston 60 to the chamber 71 which latter chamber receives fluid from the reservoir through the openings 75 and 76 in the cylinder walls which are rendered effective by movement of the piston 60 upwardly. As the piston rod 55 is moved outwardly of the shock absorber body, the casing 95 is moved therewith and consequently the abutment ring 96 on said casing will move the cage 81 relatively to the tubular reservoir 51 to compress spring 90. Shell 81 will not move to follow the abutment ring 96 inasmuch as its flange 87 abuts against the annular flange 88 on the reservoir tube 51. The restriction to the fluid flow from chamber 70 through the piston 60 by valve 63 causes the shock absorber to resist the impact or the movement of the block 100 against the lever 102 thereby cushioning this sudden movement due to recoil. After this movement has been cushioned and stopped, the spring 90 will become effective to return the case 95 and its attached piston rod 55 into the normal position whereby the piston 60 is again moved into its normal position between the openings 75 and 76 in the cylinder wall 20 of the shock absorber. As the piston moves downwardly under the effect of the spring 90 fluid is taken into the cylinder chamber from the annular space 45 fed by the reservoir through the opening 77, the fluid passing through the passages 44 in head member 42 and the spring loaded intake valve 46.

If, in some installations, the shock absorber is suddenly moved in the opposite direction so that the piston rod 55 is moved inwardly of the shock absorber to reciprocate the piston 60 toward the valve cage 21 of the cylinder 20, then pressure will be exerted upon the fluid in chamber 71, effecting the opening of the valve 64 to establish a restricted fluid flow from the chamber 71 through the piston 60, past the valve 64. This restriction to fluid flow from chamber 71 into chamber 70 causes the shock absorber to resist and cushion movement of the two relatively movable members of the gun carriage or whatever members of the shock absorber is connected between. As the piston 60 is moved toward the cage 21 the case 95, moving with the piston rod 55, will cause its abutment ring 96 to move the shell 81 longitudinally of the reservoir tube 51 to compress spring 91. When the two relatively movable members between which the shock absorber is connected have their movement cushioned and stopped by the shock absorber the spring 91 becomes effective again to return the shock absorber and member attached thereto into their normal positions in which the piston 60 of the shock absorber rests between the two openings 75 and 76 of the cylinder wall. As the piston 60 moves upwardly away from the cage 21 fluid will be directed into the chamber 71 from the reservoir 52 through the opening 22 of the valve cage 21 and past the lightly spring loaded valve 23 thereby again returning the shock absorber to its normal condition ready to cushion the next relative movement of the members between which it is connected.

The passage 53 in the head member 40 relieves the packing 54 from excessive fluid pressure and thereby eliminates leaks which might occur if high pressure were permitted to be exerted against a packing of this type.

While the embodiment of the present invention as herein disclosed, constitutes a preferred form, it is to be understood that other forms might be adopted.

What is claimed is as follows:

1. A self-centering shock absorber consisting of a fixed cylinder provided with head members, a fluid reservoir surrounding the cylinder and attached to said cylinder head members; a rod slidably extending through one cylinder head member and having a piston thereon within the cylinder, said piston normally being positioned between two spaced apertures in the cylinder wall connecting said cylinder with the reservoir; two oppositely acting fluid flow restricting valves in the piston; a one way valve in each cylinder head member providing communication between the reservoir and the respective cylinder chambers on each side of the piston; two separate coil springs surrounding the reservoir, one coil spring abutting against the rod carrying head member, the other coil spring against an annular flange on the reservoir; a shiftable abutment interposed between said springs; and means secured to said shiftable abutment and the piston rod interconnecting the same.

2. A self-centering shock absorber consisting of two concentrically spaced tubular members attached to a head member at each end, one of said tubular members providing a working cylinder, the other a fluid reservoir; a rod slidably extending through one head member and having a piston thereon normally held in a predetermined position in the cylinder, said piston having valved passages for controlling the transfer of fluid from one side of the piston to the other; valved passages in the head members operative to establish fluid flow from the reservoir into the respective ends of the cylinder; apertures in the cylinder wall on each side of the piston when it is in normal position; an abutment carried by the piston rod and movable therewith; and resilient means interposed between said abutment and stationary abutments on one of said tubular members, said means yieldably holding the rod and its piston in normal position relatively to the cylinder.

3. A self-centering shock absorber consisting of two concentrically spaced tubes both closed at one end by a closure member, the other ends of said tubes having individual head members, one resting upon the other, the inner tube forming a working cylinder, the outer tube a fluid reservoir; valves in the head member and closure member of the working cylinder, each valve providing for the transfer of fluid from the reservoir into the working cylinder; a rod slidably extending through said closure member into the working cylinder; a valved piston in the cylinder attached to said rod and normally held in a predetermined position within the cylinder by said rod; openings in the cylinder tube adjacent each side of the piston when said piston is in normal position; a collar encircling the reservoir tube and movable relative thereto; a casing surrounding the collar and attached thereto and to the said rod so as to be movable with said rod; two cylindrical shells surrounding the reservoir tube each shell having an inwardly extending annular flange at each end thereof, the annular flanges at the adjacent ends of said shells abutting against the said collar, the outer annular flange of the one shell normally engaging the closure member and the outer annular flange on the second shell normally abutting an annular flange on the reservoir tube; and a coil spring inside each shell, surrounding the reservoir tube, both springs seating upon the collar engaging flanges of their respective shells, the one spring engaging the closure member, the other spring the flange on the reservoir tube.

4. A self-centering hydraulic shock absorber consisting of a working cylinder; a fluid reservoir in communication with said cylinder; a valve at each end of the cylinder providing for the transfer of fluid from the reservoir into the cylinder; a piston in the cylinder normally held in a predetermined position therein by a rod extending from an end of the cylinder; oppositely acting, valved passages in the piston providing for restricted transfer of fluid from one side of the piston to the other as the piston is reciprocated by the rod; openings in the cylinder on each side of the piston when it is in the normal position said openings connecting the reservoir with the interior of the cylinder; two shells surrounding the shock absorber, each shell having an inwardly extending flange engageable with an abutment stationary relative to the working cylinder so that the adjacent ends of the shells are spaced apart; a coil spring in each shell yieldably urging the shells toward each other; and a casing attached to the piston rod, said casing enveloping one of the shells and having an inwardly extending flange member projecting into the space between said shells and engaged by the adjacent ends of said shells.

5. A self centering hydraulic shock absorber consisting of a cylinder and a concentrically spaced tube, a closure member closing one end of both said cylinder and said tube, individual closure members for the other ends of said cylinder and said tube, the space between said cylinder, said tube and said closure members defining a fluid reservoir, each cylinder closure member having a valve providing for the transfer of fluid from the reservoir into the cylinder; a piston in the cylinder attached to a rod extending slidably through one closure member, said rod normally holding the piston substantially centrally between the valved closure members; fluid passage openings in the cylinder contiguous to each side of the piston when in the normal position in the cylinder; two oppositely acting fluid flow restricting valves in the piston; a casing fitting about the shock absorber, one end of the casing being anchored to the piston rod the other end having an abutment ring attached thereto which surrounds the reservoir tube; and spring loaded shells each containing an activating spring for the same enveloping the reservoir tube, each shell normally engaging a fixed abutment connected with the reservoir tube and the abutment ring on the casing, said spring loaded shells holding the casing attached to the piston rod yieldably in the normal position.

6. A self centering hydraulic shock absorber consisting of a cylinder and a concentrically spaced tube, a closure member closing one end of both said cylinder and said tube, individual closure members for the other ends of said cylinder and said tube, the space betwen said cylinder, said tube and said closure members defining a fluid reservoir, each cylinder closure member having a valve providing for the transfer of fluid from the reservoir into the cylinder; a piston in the cylinder attached to a rod extending slidably through one closure member, said rod normally holding the piston substantially centrally between the valved closure members; fluid passage openings in the cylinder contiguous to each side of the piston when in the normal position in the cylinder; two oppositely acting fluid flow restricting valves in the piston; and means extending betwen the piston rod and the reservoir tube operative yieldably to oppose movement of the piston out of normal position and to return said piston into its normal position after being moved therefrom in either direction, said means consisting of oppositely acting spring loaded telescopic members, each having an activating spring for the same to effect said opposite action supported by the reservoir tube and mechanically connected to the piston rod.

References Cited in the file of this patent

UNITED STATES PATENTS

| | | |
|---|---|---|
| 1,811,152 | Seversky | June 23, 1931 |
| 2,358,340 | Lucht | Sept. 30, 1944 |
| 2,496,952 | Mercier | Feb. 7, 1950 |
| 2,527,034 | Rossman | Oct. 24, 1950 |

FOREIGN PATENTS

| | | |
|---|---|---|
| 658,291 | Great Britain | Oct. 3, 1951 |